US 6,676,219 B1

(12) United States Patent
Brewer

(10) Patent No.: US 6,676,219 B1
(45) Date of Patent: Jan. 13, 2004

(54) PASSENGER RESTRAINT ASSEMBLY FOR SCHOOL BUSES

(76) Inventor: Christine Brewer, Box 27, Site, RR1, Innisfail, Alberta (CA), T4G 1T6

( * ) Notice: Subject to any disclaimer, the term of this patent is extended or adjusted under 35 U.S.C. 154(b) by 0 days.

(21) Appl. No.: 10/336,401

(22) Filed: Jan. 3, 2003

(51) Int. Cl.[7] .............................................. B60R 22/00
(52) U.S. Cl. ..................................... 297/485; 297/483
(58) Field of Search ............................. 297/464, 475, 297/483, 484, 485

(56) References Cited

U.S. PATENT DOCUMENTS

| | | | | |
|---|---|---|---|---|
| 2,710,649 A | * | 6/1955 | Griswold, II et al. | 297/483 |
| 3,321,247 A | | 5/1967 | Dellender | 297/389 |
| 3,471,197 A | * | 10/1969 | Ely | 297/468 |
| 3,582,136 A | * | 6/1971 | Pringle | 297/483 |
| 3,618,975 A | * | 11/1971 | Bombach | 297/483 |
| 3,834,758 A | | 9/1974 | Soule | 297/389 |
| 3,954,280 A | | 5/1976 | Roberts et al. | 280/744 |
| 3,994,513 A | | 11/1976 | Courtis et al. | 280/747 |
| 4,205,670 A | | 6/1980 | Owens | 128/134 |
| 4,632,425 A | | 12/1986 | Barratt | 280/801 |
| 4,709,966 A | | 12/1987 | Parkinson et al. | 297/473 |
| 6,123,388 A | | 9/2000 | Vits et al. | 297/216.13 |
| 6,312,056 B1 | * | 11/2001 | Murphy et al. | 297/464 |
| 6,508,515 B2 | * | 1/2003 | Vits et al. | 297/483 |

* cited by examiner

Primary Examiner—Peter R. Brown
(74) Attorney, Agent, or Firm—Sturm & Fix LLP

(57) ABSTRACT

A passenger restrain assembly (10) for school buses having a seat and seat back supported by a tubular support framework (100) wherein the restraint assembly (10) includes three different length strap members (30) (40) (60) or in the alternative (30') (30") and (40) each having one end provided with an anchor unit (11) (11') (11") that is connected to a portion of the tubular support framework (100) wherein the shortest strap member (40) is provided with the female component (51) of a bayonet style clip (50) one of the remaining strap members (30) or (30') captively engages the seat back and the other of the remaining strap members (60) or (30") is provided with the male component (52) of the bayonet style clip to form the chest strap and a portion of the lap strap of the restraint assembly (10).

2 Claims, 3 Drawing Sheets

PASSENGER RESTRAINT ASSEMBLY FOR SCHOOL BUSES

BACKGROUND OF THE INVENTION

CROSS REFERENCE TO RELATED APPLICATIONS

Not applicable.

1. Field of the Invention

The present invention relates to the field of restraint harness arrangements for children in general and in particular to a restraint harness assembly specifically designed for use in conventional school bus seats.

2. Description of Related Art

As can be seen by reference to the following U.S. Pat. Nos. 3,954,280; 3,321,247; 3,834,758; and, 4,205,670, the prior art is replete with myriad and diverse passenger restraint assemblies designed for different vehicles such as cars and/or school buses.

While all of the aforementioned prior art constructions are more than adequate for the basic purpose and function for which they have been specifically designed, they are uniformly deficient with respect to their failure to provide a simple, efficient, and practical restraint arrangement that is specifically designed for attachment to the tubular steel framework that supports the seats in conventional school buses.

While most modern school buses are provided with built-in seat buckle arrangements, there is a large number of older school buses that do not have any type of restraint system provided therein, and this represents a dangerous situation for tens, if not hundreds of thousands, of school children who travel to and from school each day in these older buses.

As a consequence of the foregoing situation, there has existed a longstanding need among school systems using the older style school buses for a new and improved passenger restraint assembly that attaches directly to the tubular support framework that is standard equipment in virtually all of the older style school buses; and, the provision of such an arrangement is the stated objective of the present invention.

BRIEF SUMMARY OF THE INVENTION

Briefly stated, the passenger restraint assembly for school buses that forms the basis of the present invention comprises in general a plurality of anchor units, a seat engaging unit and a child engaging unit that cooperate with one another to provide a three point restraint harness that is operatively connected to the conventional seat framework system employed on older school bus seats.

As will be explained in greater detail further on in the specification, the basic passenger restraint assembly comprises three strap members having different lengths wherein each of the strap members is operatively connected to one of the anchor units to secure one end of each strap member to different portions of the school bus support framework.

In both versions of the invention, the shortest strap member comprises one half of the seat or lap belt whereas the roles of the longest and intermediate length strap members switch from a seat back connecting role to a lap and chest strap role depending upon whether or not the restraint assembly is manually adjustable or relies upon a strap retraction member to insure that the chest strap snugly engages the chest of a child.

BRIEF DESCRIPTION OF THE SEVERAL VIEWS OF THE DRAWINGS

These and other attributes of the invention will become more clear upon a thorough study of the following description of the best mode for carrying out the invention, particular when reviewed in conjunction with the drawings, wherein.

DETAILED DESCRIPTION OF THE INVENTION

Figure 1:
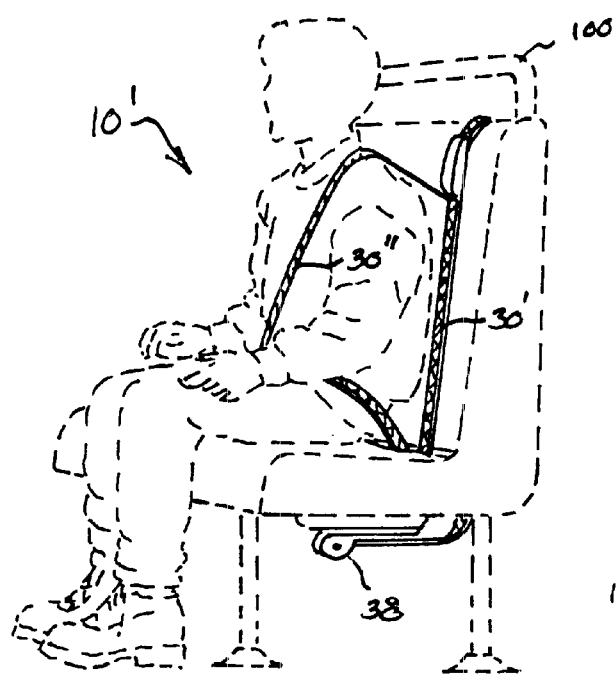
FIG. 1 is a perspective view of a modified version of the passenger restraint assembly equipped with an optional retraction unit.
Figure 2:
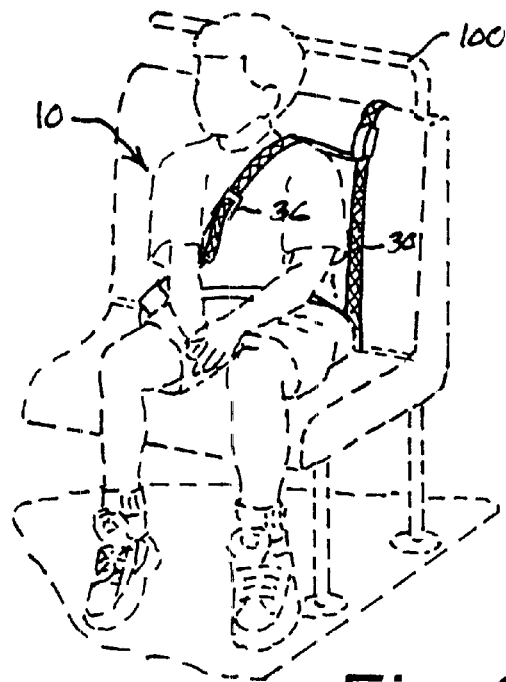
FIG. 2 is a left side perspective view of the standard version of the restraint assembly in use.
Figure 3:
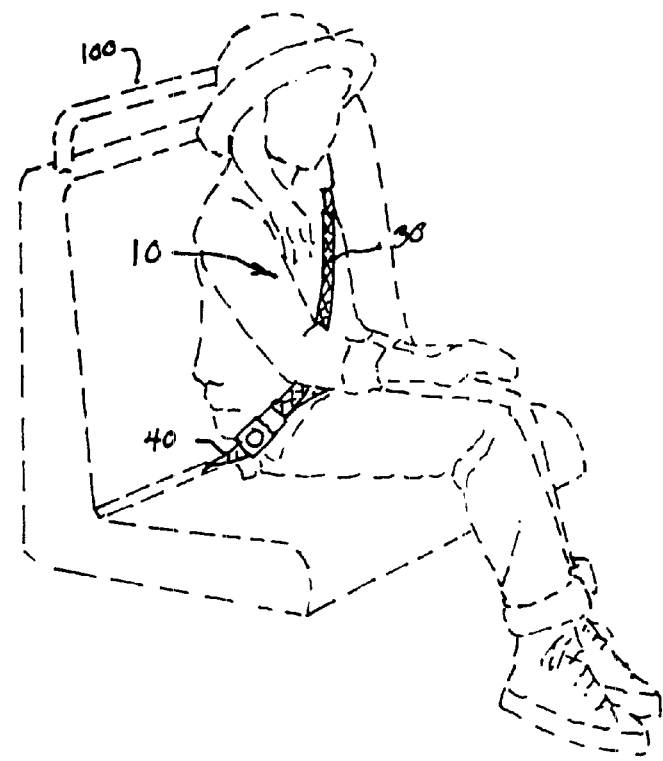
FIG. 3 is a right side perspective view of either version of the restraint assembly in use.
Figure 4:
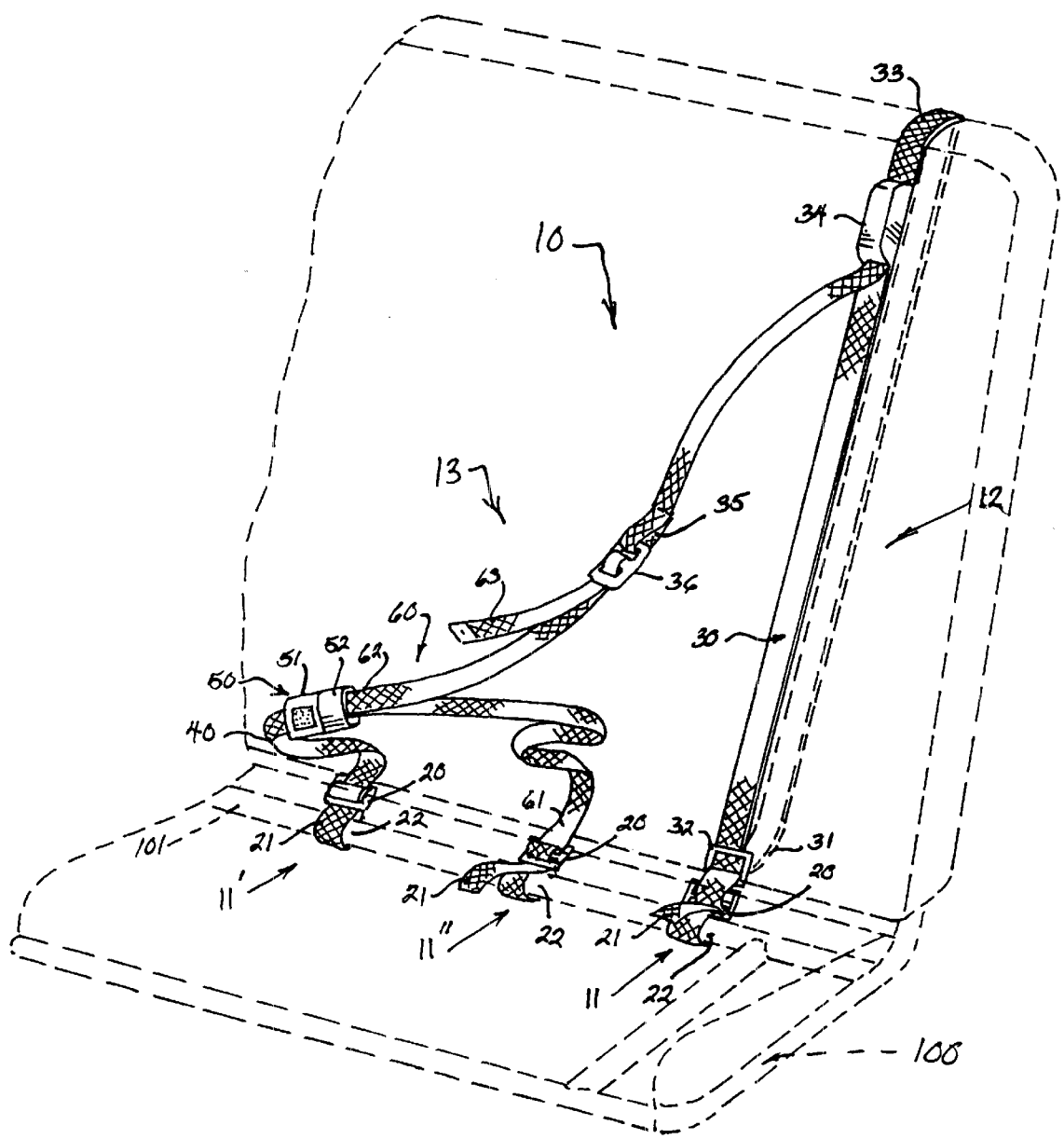
FIG. 4 is a perspective view of the standard version of the restraint assembly affixed to the seat back and seat support framework; and, FIG. 5 is a an isolated perspective view of the modified version of the passenger restraint assembly.

As can be seen by reference to the drawings, and in particular to FIG. 4, the passenger restraint assembly for school buses that forms the basis of the present invention is designated generally by the reference number 10. The restraint assembly comprises in general a plurality of framework attachment units 11 11' 11", a seat-back engaging unit 12 and a child restraint unit 13. These units will now be described in seriatim fashion.

Figure 5:
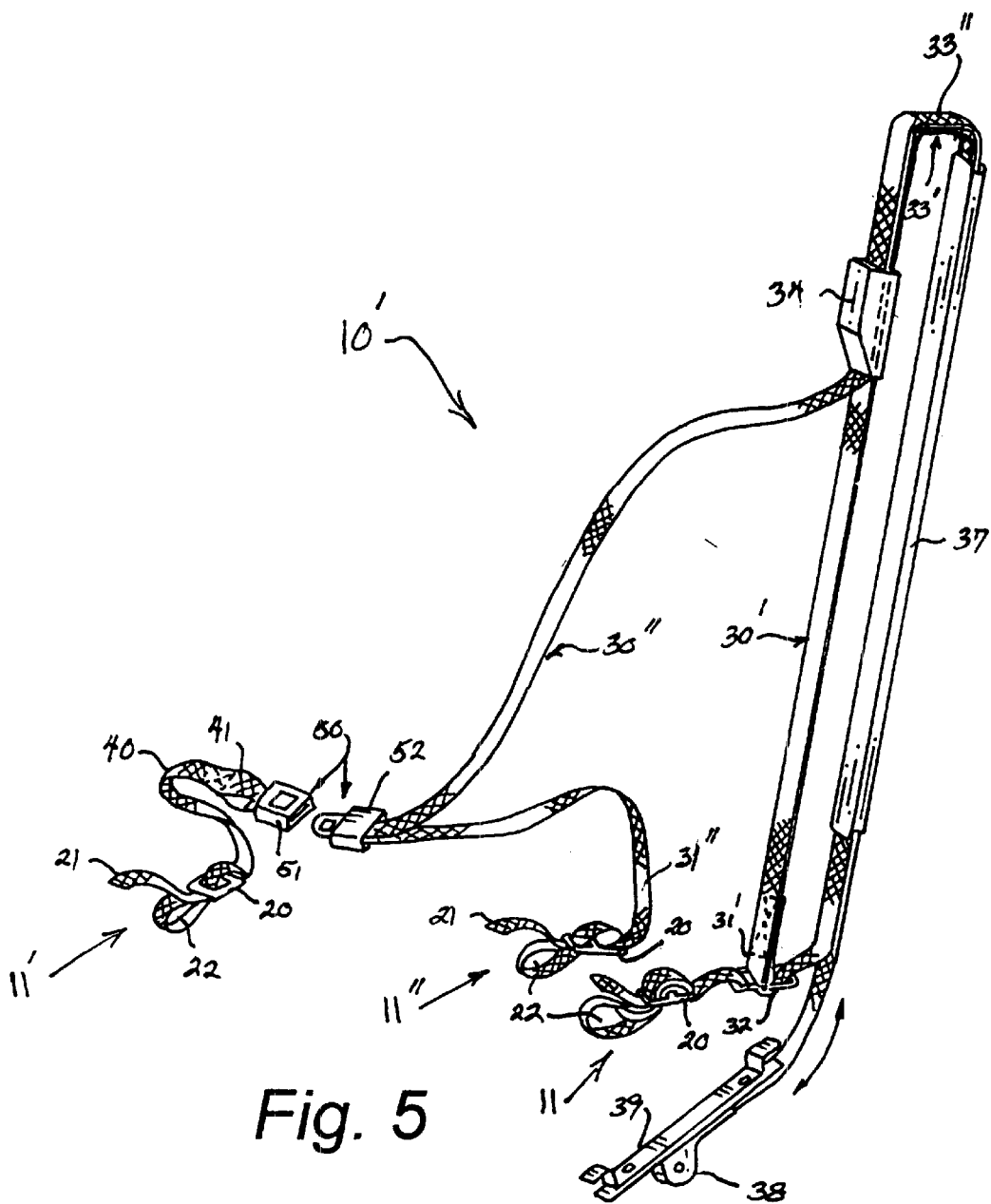

As shown in FIGS. 4 and 5, each of the plurality of framework attachment units 11 11' 11" includes an H-shaped buckle member 20 having a length of belt webbing 21 threaded therethrough in a conventional manner to form a discrete looped opening 22 that will captively surround one of the lower horizontal crossbars 101 that forms the tubular seat support framework 100.

In the standard version of the preferred embodiment depicted in FIG. 4, it can be seen that the seat back engaging unit 12 comprises an elongated seat back strap member 30 having a lower end 31 operatively engaged with a first framework attachment unit 11 after being threaded through a first auxiliary H-shaped buckle member 32; wherein, the intermediate portion 33 of the seat back strap member 30 passes through a slidable clasp element 34 which is adapted to increase and decrease the effective length of the free end 35 of the seat back strap member 30 which captively engages the upper portion of a second auxiliary H-shaped buckle member 36, the purpose and function of which will be described in greater detail further on in the specification.

Still referring to FIG. 4, it can be seen that the child restraint unit 13 comprises in general a short strap member 40 having a lower end operatively associated with the framework attachment unit 11 and an upper end 42 provided with the female component 61 of a bayonet style clip designated generally as 50.

In addition, the child restraint unit further comprises an intermediate length strap member 60, the lower end 61 of which is operatively connected to the framework attachment unit 11", the intermediate portion 62 of which is threaded through the male component 52 of the bayonet style clip 50 and the upper end of which 63 passes through the lower portion of the second auxiliary H-shaped buckle member 36.

By now it should be appreciated that the short strap member and the lower and intermediate portions of the intermediate length strap member 60 in conjunction with the bayonet style clip 50 function as a standard seat belt; whereas, the adjustable length upper portion 63 of the intermediate length strap member 60 and the upper end 35 of the elongated length strap member 30 in conjunction with the first auxiliary H-shaped buckle member 36 constitute an adjustable length chest strap of the standard version of the restraint assembly 10.

Turning now to FIG. 5, it can be seen that in the modified version of the preferred embodiment, instead of a single elongated strap member 30, two separate elongated strap members 30' 30" are employed wherein one end 31' of the first elongated strap member 30' is captively secured to the cross bar of the first auxiliary-shaped buckle member 32, the intermediate portion 35' of the first elongated strap member 30' passes through a slidable clasp element 34 disposed on the front of the seat back and an elongated sheath 37 disposed on the rear of the seat back, and the other end of the elongated strap member 30' passes through the first framework attachment unit 11.

In addition, the longer 30" of the two elongated strap members 30' 30" has one end 31" connected to the third framework attachment unit 11' and then passes sequentially through the male component 52 of the bayonet clip member 50, the slidable clasp element 34 on the front of the seat back, the sheath 37 on the rear of the seat back and then terminates in a strap retraction element 38 connected to a mounting bracket 39 adapted to be secured to the seat framework 100.

In this version of the invention, the longer of the elongated strap members 30" forms one half of the seat belt as well as the chest strap of the restraint assembly 10 whereas the shorter of the elongated strap members 30' serves to operatively engage the longer of the elongated strap members 30" to the seat back.

At this juncture it should be noted that in both versions of the preferred embodiment, three different length strap members 30 40 60 as well as 30' 30" and 40 are required to complete the restraint assembly 10 10' wherein all of the strap members 30 30' 30" 40 and 60 have one end associated with one of the framework attachment units 11 11' and 11" and wherein the purpose, function and construction of the shortest strap member 40 is the same in each version.

Although only an exemplary embodiment of the invention has been described in detail above, those skilled in the art will readily appreciate that many modifications are possible without materially departing from the novel teachings and advantages of this invention. Accordingly, all such modifications are intended to be included within the scope of this invention as defined in the following claims.

Having thereby described the subject matter of the present invention, it should be apparent that many substitutions, modifications, and variations of the invention are possible in light of the above teachings. It is therefore to be understood that the invention as taught and described herein is only to be limited to the extent of the breadth and scope of the appended claims.

I claim:

1. A passenger restraint assembly in combination with older style school buses having a seat and a seat back supported by a tubular support framework wherein, the restraint assembly comprises:

three strap members including an elongated strap member, an intermediate length strap member and a short strap member wherein, the elongated and intermediate length strap members are operatively associated with said seat back and the intermediate length strap member forms a portion of the seat belt and the chest strap and wherein, all of the strap members have a first end and a second end three anchor units wherein each anchor unit is associated with the first ends of each of the three strap members and adapted to connect said first ends to different portions of the support framework of a school bus seat; and, a bayonet clip member including a female component attached to the second end of the short strap member and a male component attached to one of the remaining strap members wherein, the second end of the longest strap member is provided with a strap retraction element that is affixed to the tubular support framework; and, wherein, the longest strap member passes through a slidable clasp element on the front of the seat back and a sheath on the rear of the seat back.

2. The restraint assembly in claim 1, wherein, the intermediate length strap member also passes through the sheath on the rear of the seat back.

\* \* \* \* \*